United States Patent [19]

Beni et al.

[11] 4,340,278

[45] Jul. 20, 1982

[54] ELECTROCHROMIC DEVICE

[75] Inventors: Gerardo Beni, Westfield; Catherine E. Rice, Middletown; Joseph L. Shay, Holmdel, all of N.J.

[73] Assignee: Bell Telephone Laboratories, Incorporated, Murray Hill, N.J.

[21] Appl. No.: 151,443

[22] Filed: May 19, 1980

[51] Int. Cl.³ .............................................. G02F 1/17
[52] U.S. Cl. .................................. 350/357; 252/408; 252/518; 252/519
[58] Field of Search ............... 350/357; 252/408, 518, 252/519

[56] References Cited

U.S. PATENT DOCUMENTS

| | | | |
|---|---|---|---|
| 4,146,309 | 3/1979 | Singh et al. | 350/357 |
| 4,191,453 | 3/1980 | Beni et al. | 350/357 |
| 4,201,454 | 5/1980 | Beni et al. | 350/357 |
| 4,258,984 | 3/1981 | Beni et al. | 350/357 |

OTHER PUBLICATIONS

Dautremont-Smith, W. C., et al., Appl. Phys. Lett., vol. 35, No. 7, pp. 565-567 (Oct. 1, 1979).
Shay, J. L., et al., IEEE Trans. Electronic Devices, vol. Ed-26, No. 8, pp. 1138-1143 (Aug. 1979).
Gottesfeld, S., et al., Appl. Phys. Lett., vol. 33, No. 2, pp. 208-210 (1978).

Primary Examiner—Teddy S. Gron
Attorney, Agent, or Firm—Bruce S. Schneider

[57] ABSTRACT

Electrochromic devices based on anion transfer have been made. These devices utilize an iridium oxide electrochromic electrode in conjunction with an electrolyte that provides a source of anions with formula weight in the range 18 to 33.

10 Claims, 2 Drawing Figures

ELECTROCHROMIC DEVICE

BACKGROUND OF THE INVENTION

1. Field of the Invention

This invention relates to display devices and, more particularly, to electrochromic devices.

2. Art Background

Electrochromic cells are actively being investigated for use as display devices. Most of this investigative effort has involved devices utilizing $WO_3$. Recently iridium oxide has been suggested as a viable alternative to the established $WO_3$ containing cell. These cells are fabricated by immersing an electrochromic iridium oxide electrode in an aqueous electrolyte. Both acidic and basic electrolytes are useful and yield a long term memory with extremely good response times, e.g., 50 milliseconds for an optical reflectance change of 50%. The mechanism in iridium oxide cells leading to the electrochromic behavior has engendered considerable controversy. (See S. Gottesfeld and J. D. E. McIntyre, *Journal of the Electrochemical Society*, 126, 742, [1979], and G. Beni and J. L. Shay, *Applied Physics Letters*, 33, 208 [1978].) For example, these proposed mechanisms are based on either proton or electron exchange between the electrolyte and the electrochromic iridium oxide electrode to produce charge neutrality. That is, it is postulated in these mechanisms that during coloration either a proton is ejected or an electron is injected to compensate for the electron extracted by the potential applied to the electrode to change its reflectivity.

SUMMARY OF THE INVENTION

Iridium oxide based devices involving the injection into an iridium oxide electrochromic electrode of an anion having a formula weight greater than 18, but less than 33 have been made. Contrary to previous belief, it has been found that anion injection and ejection are appropriate means for compensating for charge changes produced during coloration and bleaching respectively of an electrochromic iridium oxide electrode. Thus, it is possible for the inventive devices to operate with an electrolyte providing a source of appropriate anions to be injected into the electrochromic electrode. For example, it is possible to use a non-aqueous, i.e., $H_2O$ less than 10 parts per million by volume, electrolyte having an anion such as $F^-$.

Coloration is achievable using anions in the prescribed molecular weight range. Despite the size of these anions acceptable response times are achievable. Both liquid cells, i.e., those relying on a liquid electrolyte, and solid state cells, i.e., those which utilize a solid electrolyte are useful.

DETAILED DESCRIPTION

Figure 1:
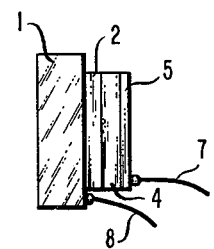
FIGS. 1 and 2 are schematic representations of possible configurations for devices within the subject invention.
Figure 2:
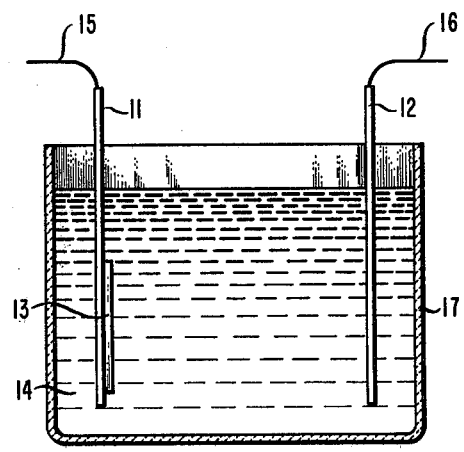

The inventive devices comprise an iridium oxide electrochromic electrode in intimate contact with an electrolyte which, in turn, is in intimate contact with a counterelectrode. The fabrication of electrochromic iridium oxide electrodes has been described in detail. (See, for example, S. Gottesfeld, J. D. E. McIntyre, G. Beni, and J. L. Shay, *Applied Physics Letters*, 33, 567 [1978] and U.S. Pat. No. 4,191,453, issued Mar. 4, 1980, which is hereby incorporated by reference, for a description of anodic growth, and, L. M. Schiavone et al, *Applied Physics Letters*, 35, 823 (1979) for vacuum deposition.) Briefly, the anodic method of manufacture comprises immersing a sheet or film or iridium in a 0.5 M aqueous solution of $H_2SO_4$. An inert counterelectrode, e.g., platinum, and a saturated calomel electrode (SCE) are also immersed in the $H_2SO_4$ solution. One-second wide voltage pulses alternating between $-0.25$ and $+1.25$ are maintained between the iridium electrode and the SCE electrode to grow the electrochromic iridium oxide film. The duration of growth determines the thickness of the iridium oxide films. Alternatively, electrochromic iridium oxide is produced by reactively sputtering iridium in an atmosphere of $O_2$ at a pressure of approximately 20 $\mu$m. In this sputtering procedure, conventional substrates such as tantalum, tin oxide-coated glass, or iridium are utilized. The period of sputtering determines the thickness of the iridium oxide film.

The thickness of the electrochromic iridium oxide film is an important factor in determining the reflectivity change and response time of a device for a given applied voltage. Response times and reflectivity changes generally increase with increased film thickness. Thus, changing the thickness improves one parameter at the expense of the other. Thicknesses in the range 500 to 5000 Angstroms, generally produced acceptable response times together with acceptable reflectivity changes. Thinner films are typically not preferred because inadequate reflectivity changes occur while thicker films are usually less desirable due to increased response times. (The thicknesses given above refer to the dimension of the iridium oxide layer and do not include any iridium metal backing which may be present after the growth process.)

Contact to the electrochromic iridium oxide electrode to impress a voltage is made by conventional methods. For example, when a metal substrate such as an iridium sheet is utilized in the anodic growth process or reactive sputtering process a wire is simply attached by a pressure contact or by spot welding. It is also possible to anodically oxidize thin films of iridium entirely to completion. To contact such an iridium oxide thin film the iridium film is deposited by conventional techniques, e.g., electron beam evaporation onto a conducting material and the growth procedure is then performed.

As discussed above, the electrochromic iridium oxide electrode must be in intimate contact with an electrolyte. In the case of liquid electrolytes, the electrode is simply immersed in the electrolyte. When a solid electrolyte is employed contact between the electrochromic iridium oxide electrode and the electrolyte is conveniently made by direct pressure contact. Alternatively, when the electrolyte such as $PbF_2$ is adaptable to vacuum deposition, e.g., evaporation, it is possible to deposit the electrolyte directly onto the electrochromic iridium oxide electrode.

The electrolyte must be chosen to provide a source of anions having a formula weight greater than 18, but less than 33, that under the influence of a voltage impressed across the cell, are injected into (during the coloration cycle) or extracted from (during the bleaching cycle) the electrochromic electrode. Exemplary anions for this injection or extraction are $F^-$ or $CN^-$. For example, in the former case solids such as potassium bismuth fluoride or $PbF_2$ with available $F^-$ ions are appropriate electrolytes, and in the latter case an ethanol solution of a cyanide salt, e.g., KCN, is an appropriate electrolyte. In one embodiment, the electrolyte is chosen to be non-aqueous, i.e., less than 10 parts per million by volume of water.

Generally, the electrolyte should also have a conductance greater than 0.002 $ohm^{-1}$. Lower conductances generally lead to slower response times and are significantly less flexible in their application. For solid electrolytes the conductance of the electrolyte is determined both by the composition of the material and by its thickness. An appropriate combination of material composition and thickness to give the necessary conductance should be utilized. Generally, even for highly conductive materials thicknesses greater than 1 mm are unacceptable since resistances become excessive. Thicknesses less than 1000 Angstroms also are not advantageous since electrical breakdown typically occurs through imperfections in the film. For liquid electrolytes the desired conductance is easily achieved by insuring that sufficient electrolyte material (for example, a salt solute) is dissolved in the liquid media. Highly acidic or basic electrolytes, pH lower than 2 or higher than 12, are generally not advantageous when used with an anodically grown iridium oxide electrode since they generally cause degradation of this electrode. However, if the iridium oxide electrode is produced by vacuum deposition, more acidic or basic electrolytes are suitable.

The choice of counterelectrode is not critical. It is advantageous to avoid evolution of gas. This is preferably done by limiting the coloration and bleaching voltages to avoid electrolyte degradation. Typically voltages in the range $-1$ to $+1$ Volts for both solid electrolytes and liquid electrolytes such as ethanol/cyanide are useful.

The conductance of the electrode should be sufficiently large so that the electrolyte presents the limiting resistance. To achieve intimate contact between the electrolyte and the counterelectrode in the liquid cell, the counterelectrode is simply immersed in the electrolyte. For example, an electrochromic iridium oxide counterelectrode is immersed in the electrolyte. Electrical contact is made to the counterelectrode by conventional techniques such as a pressure contact. In the case of a solid electrolyte, contact between the counterelectrode and the electrolyte is made for example by pressure contact or by vacuum depositing the counterelectrode onto the electrolyte. In this case, electrical contact to the counterelectrode is made by conventional techniques such as a pressure contact.

The devices are operated by applying a voltage between the electrochromic iridium oxide electrode and the counterelectrode. The voltage applied must exceed the voltage required for anion injection. Generally, for coloration, voltages in the range 1 to 2 Volts are utilized. Similarly, the voltage necessary for bleaching of the electrochromic oxide electrode must be sufficient to extract the anion. Typically voltages in the range 0 to $-2$ Volts are suitable for the bleaching operation. (Voltages obviously may further be limited by the requirement to avoid electrolyte degradation.) However, suitable voltages vary widely with the particular counter electrode, and a control sample is used to determine appropriate voltages.

The optical properties of the various components of the cell are chosen so that the desired color changes are visible. For example, in a solid cell, FIG. 1, in a reflection configuration when the electrochromic iridium oxide electrode, 2, is bleached, light passes through a transparent substrate, 1, through the electrochromic electrode, 2, is scattered from the electrolyte, 4, and counterelectrode, 5, passes back through the electrochromic material and is observed. To increase the viewability of the color change it is advantageous to utilize electrolytes and counterelectrodes which result in diffuse rather than specular reflection. For example, electrolytes such as an ethanol solution pigmented with $TiO_2$, and counterelectrodes such as an iridium oxide electrode are useful.

The following examples are illustrative of the production of cells within the subject invention:

EXAMPLE 1

Electrochromic iridium oxide was grown on an iridium electrode in 0.5 molar $H_2SO_4$ as described in Gottesfeld, McIntyre, Beni and Shay, *Applied Physics Letters*, 33, 208, (1978). The growth was continued until a thickness of approximately 1500 Angstroms was achieved. After growth, the electrode was rinsed in distilled water and stored overnight in a desiccator over $CaSO_4$.

The electrode, 11, having the electrochromic iridium oxide film, 13, was used as an electrode in a cell, 17, containing a 0.5 molar solution, 14, of tetraethylammonium fluoride in acetonitrile. The acetonitrile was previously dried by stirring over molecular sieves under a blanket of dry $N_2$. A $Ag/Ag+$ reference electrode described by R. C. Larson, R. T. Iwamoto, and R. N. Adams, in *Anal. Chem. Acta*, 25, 371, (1961), was used for experimental purposes to accurately control the voltages used. A counterelectrode, 12, of Pt was immersed in the electrolyte, 14. Electrical contacts 15 and 16 were made to the electrodes by pressure contact. At a potential of $-1.5$ V versus the $Ag/Ag+$ electrode, the electrochromic iridium oxide electrode bleached and at $-0.5$ V, it became dark. Reflectance changes of 50 percent were observed by monitoring with a silicon detector the light from a He-Ne laser (633 nm) incident on and reflected from the device.

EXAMPLE 2

An electrochromic iridium oxide electrode was grown in 0.5 molar $H_2SO_4$ on a transparent $SnO_2$-coated glass electrode, 1, in FIG. 1, as described in Shay et al, *Applied Physics Letters*, 33, 942 (1978). The film thickness of the iridium oxide was such that the transmission at a wavelength of 633 nm of the electrochromic iridium oxide-covered electrode in the colored state was approximately 50 percent of that of the bleached state. After film growth was completed the electrochromic iridium oxide, 2, was left in the bleached state, disconnected from the voltage source, rinsed in distilled water and air-dried.

A thin film of $PbF_2$, 4, was deposited on the iridium oxide by vacuum evaporation. High purity (99.99 percent) $PbF_2$ was used as a starting material for the evaporation. The $PbF_2$ was dried under vacuum at 150 degrees C. for 24 hours before use as an evaporation source. The deposition was performed in a vacuum station at a pressure of about $5 \times 10^{-6}$ torr. The powder charge of $PbF_2$ was heated in an alumina-covered boat to a temperature sufficiently high to provide an evaporation rate of approximately 2000 Angstroms per minute. The film thickness (determined with a quartz crystal oscillator thickness monitor during growth) was approximately 2 μm.

The cells were completed by vacuum depositing a semitransparent (200 Angstroms thick) gold counterelectrode, 5, on the PbF$_2$ film, and attaching with silver paint contacts, 7 and 8, to the gold and SnO$_2$ electrodes, respectively. The transmission of this cell at 633 nm decreased by 50 percent when a potential of +1.25 V was applied to contacts, 7 and 8 with contact 8 positive. A potential of −0.25 V caused the cell to bleach.

We claim:

1. An electrochromic device comprising an electrochromic iridium oxide electrode, a counterelectrode, an electrolyte in intimate contact with said electrochromic electrode and said counterelectrode and means for applying a voltage between said electrochromic electrode and said counterelectrode CHARACTERIZED IN THAT said electrolyte is a source of an anion of formula weight in the range 18 to 33 that is capable of being injected into and extracted from said electrochromic electrode under the influence of said applied voltage.

2. The device of claim 1 wherein said electrolyte comprises less than 10 parts per million of water by volume.

3. The device of claim 1 wherein said counterelectrode comprises an electrochromic iridium oxide electrode.

4. The device of claim 1 wherein said anion is CN$^-$.

5. The device of claim 1 wherein said anion is F$^-$.

6. The device of claim 1 wherein said electrolyte comprises a liquid.

7. The device of claim 1 wherein said electrolyte comprises a solid.

8. The device of claim 1 wherein said electrolyte is a solid having a mobile F$^-$ anion.

9. The device of claim 8 wherein said electrolyte is chosen from the group consisting of potassium bismuth fluoride and PbF$_2$.

10. The device of claim 1 wherein said electrolyte is an ethanol solution of a cyanide salt.

* * * * *